Figure 1:
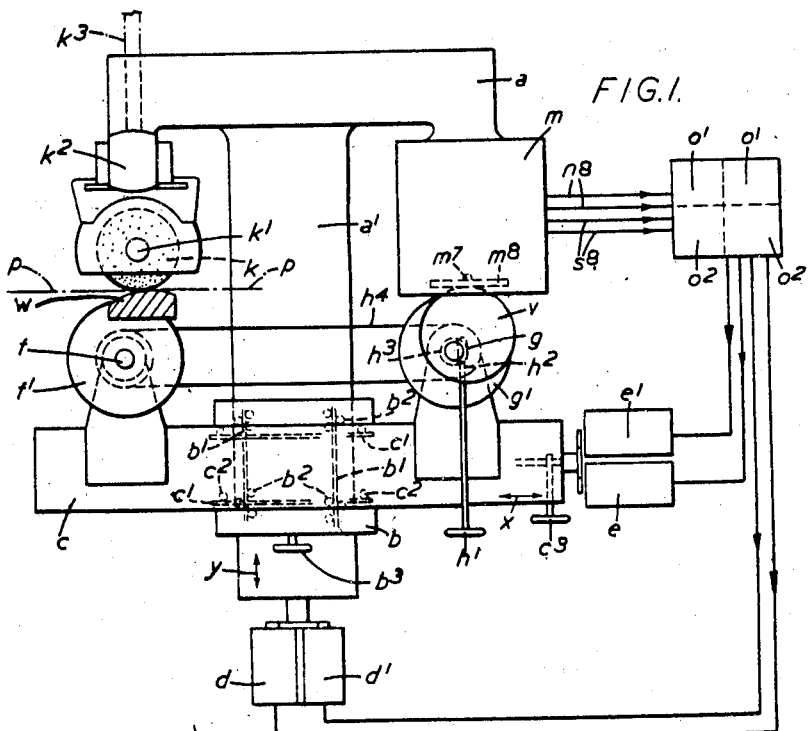

May 11, 1948.  E. A. COOKE  2,441,549
COPYING MACHINE
Filed April 5, 1946   11 Sheets-Sheet 1

Inventor
ERNEST A. COOKE
By
Emery, Holcombe + Blair
Attorney

May 11, 1948. E. A. COOKE 2,441,549
COPYING MACHINE
Filed April 5, 1946 11 Sheets-Sheet 2
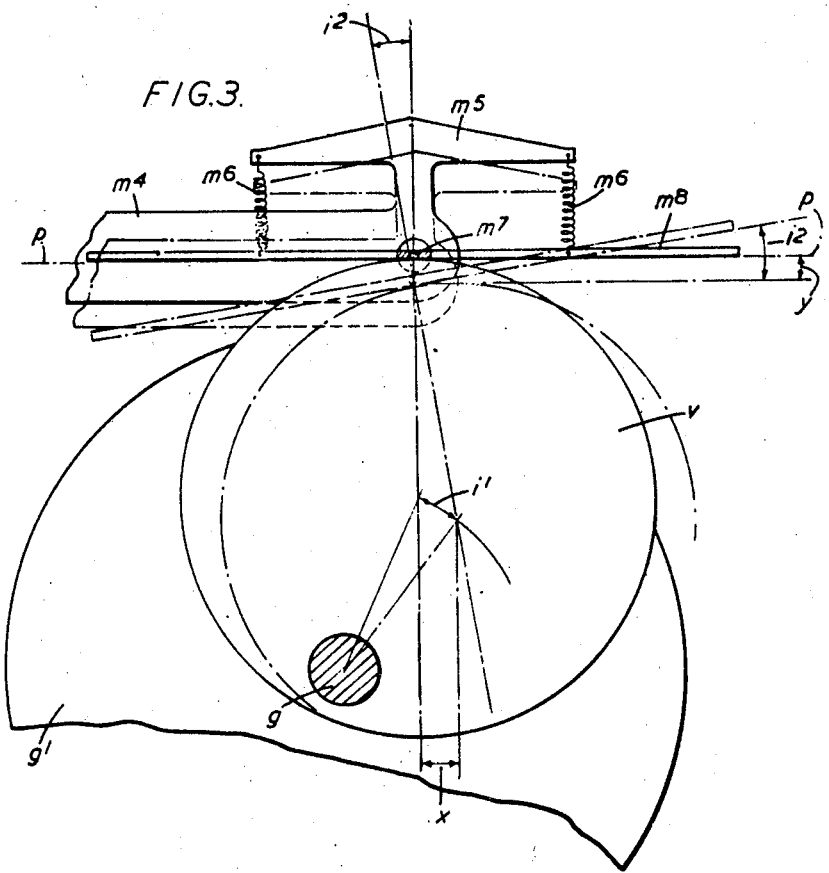
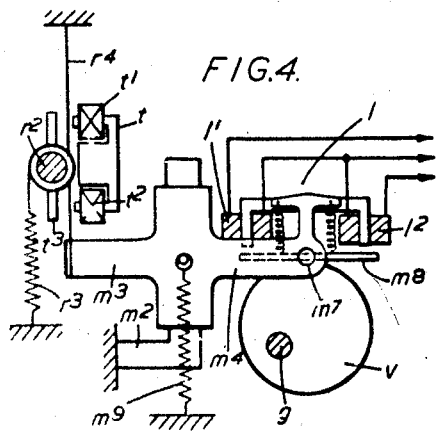
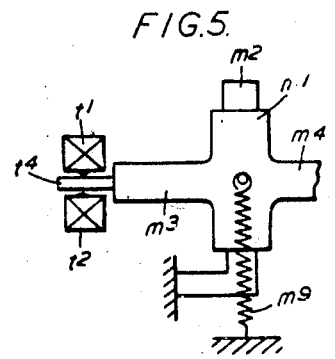
Inventor
ERNEST A. COOKE
By
Emery, Holcombe & Blair
Attorney May 11, 1948.　　　　E. A. COOKE　　　　2,441,549
COPYING MACHINE
Filed April 5, 1946　　　11 Sheets-Sheet 3

Inventor
ERNEST A. COOKE
By Emery, Holcombe & Blair
Attorney

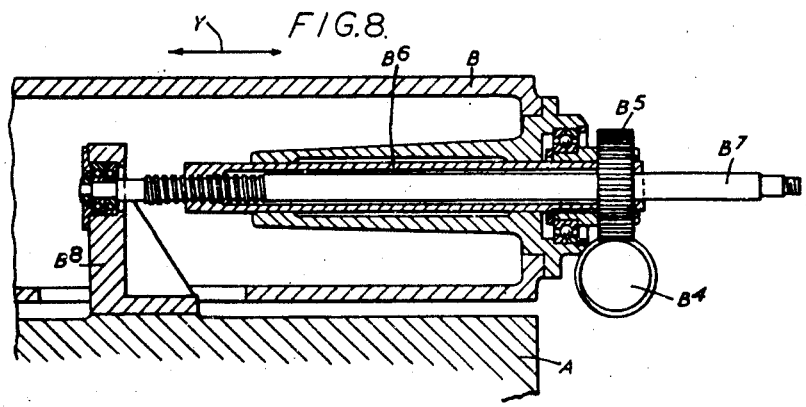
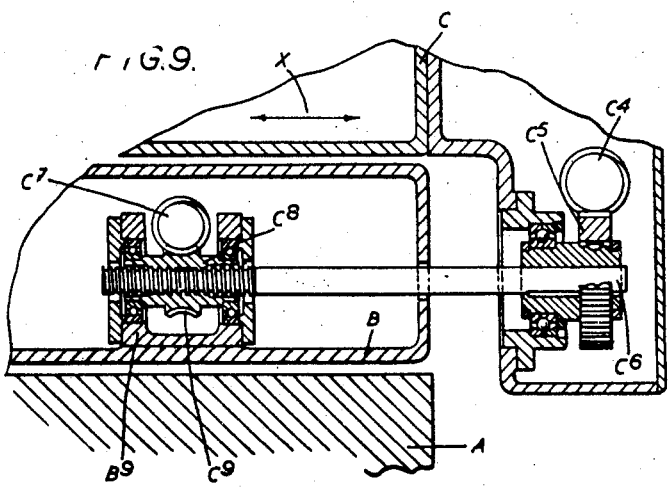
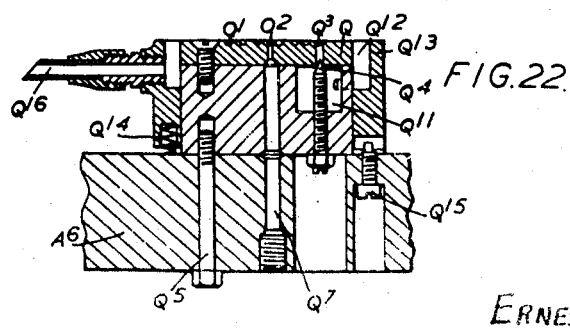

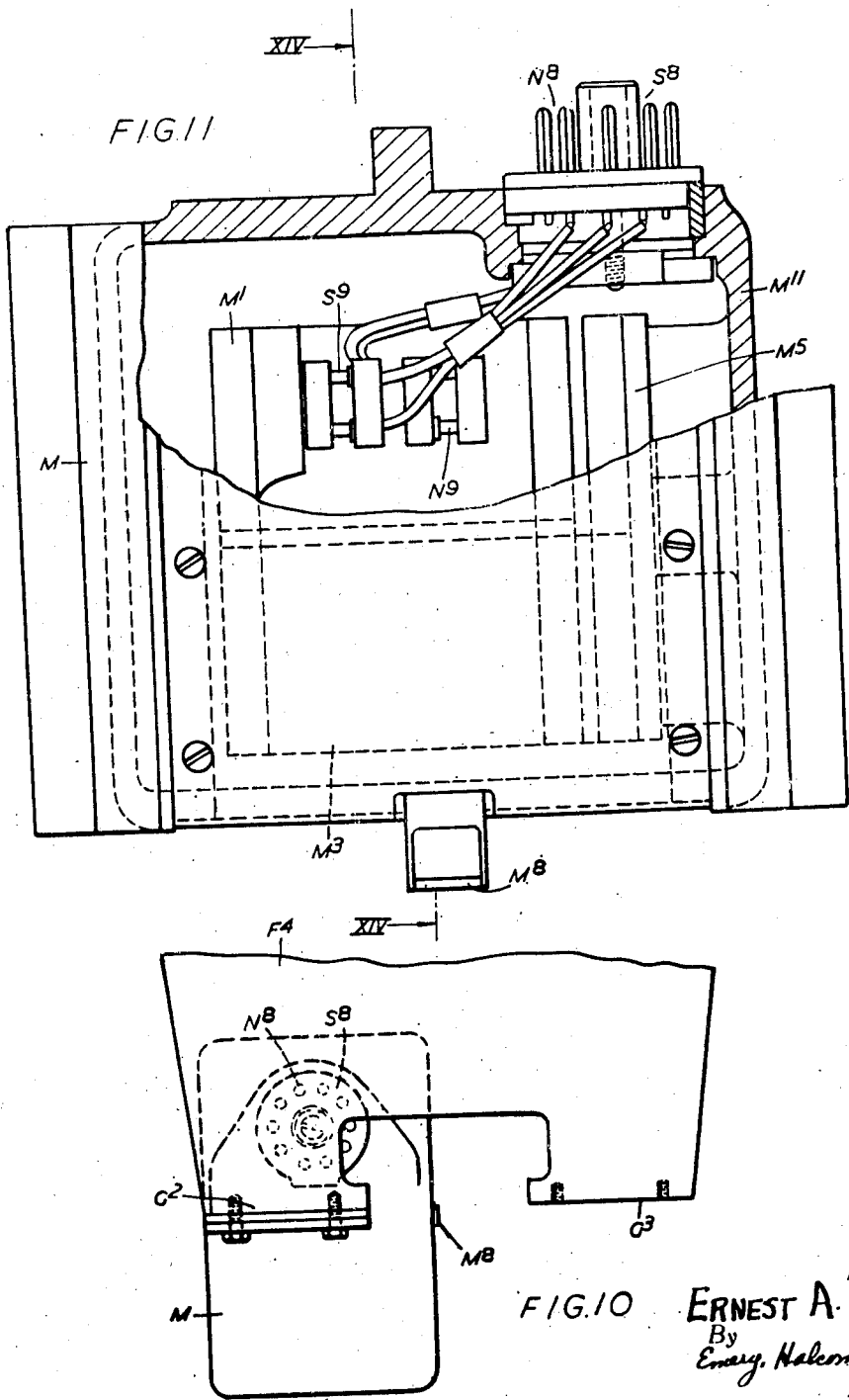

May 11, 1948.  E. A. COOKE  2,441,549
COPYING MACHINE
Filed April 5, 1946  11 Sheets-Sheet 6
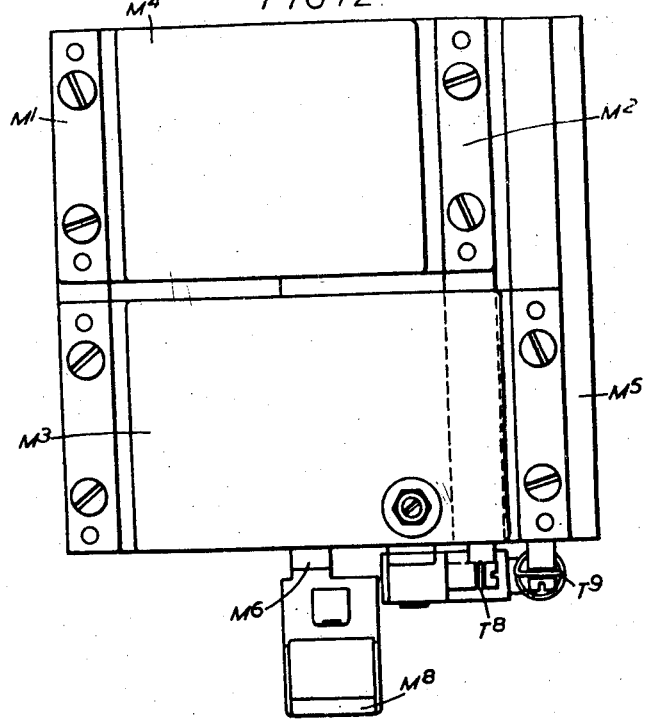
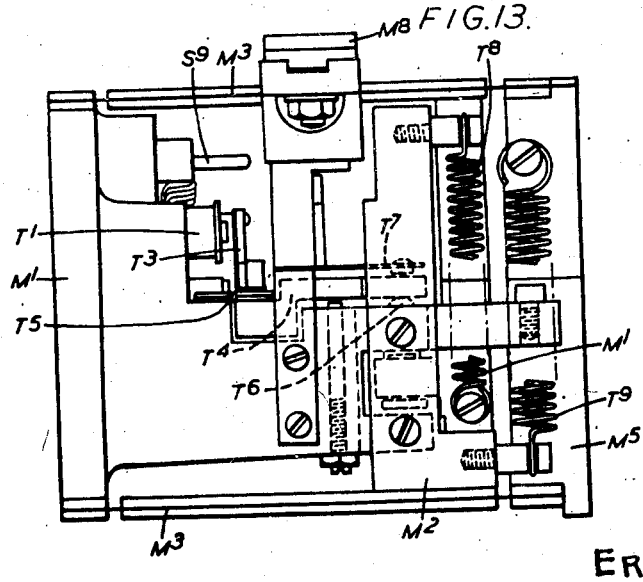
Inventor
ERNEST A. COOKE
By
Emery, Holcombe & Bliss
Attorney

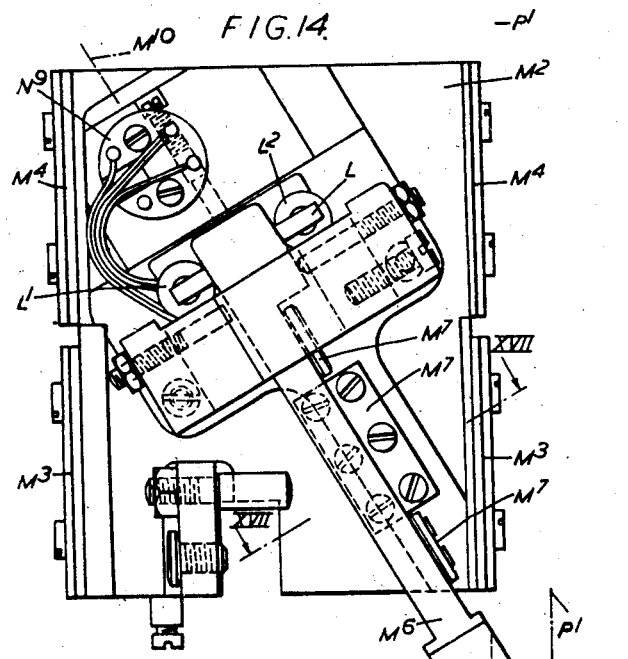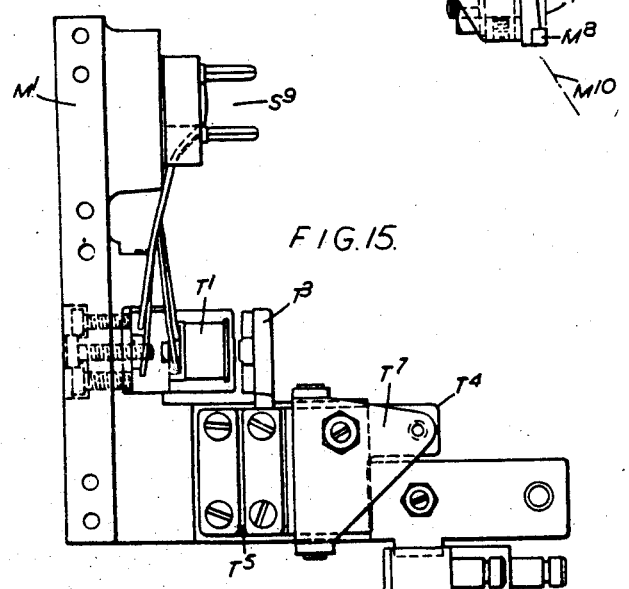

May 11, 1948.   E. A. COOKE   2,441,549
COPYING MACHINE
Filed April 5, 1946   11 Sheets-Sheet 8

Inventor
ERNEST A. COOKE
By
Emery, Holcombe & Blair
Attorney

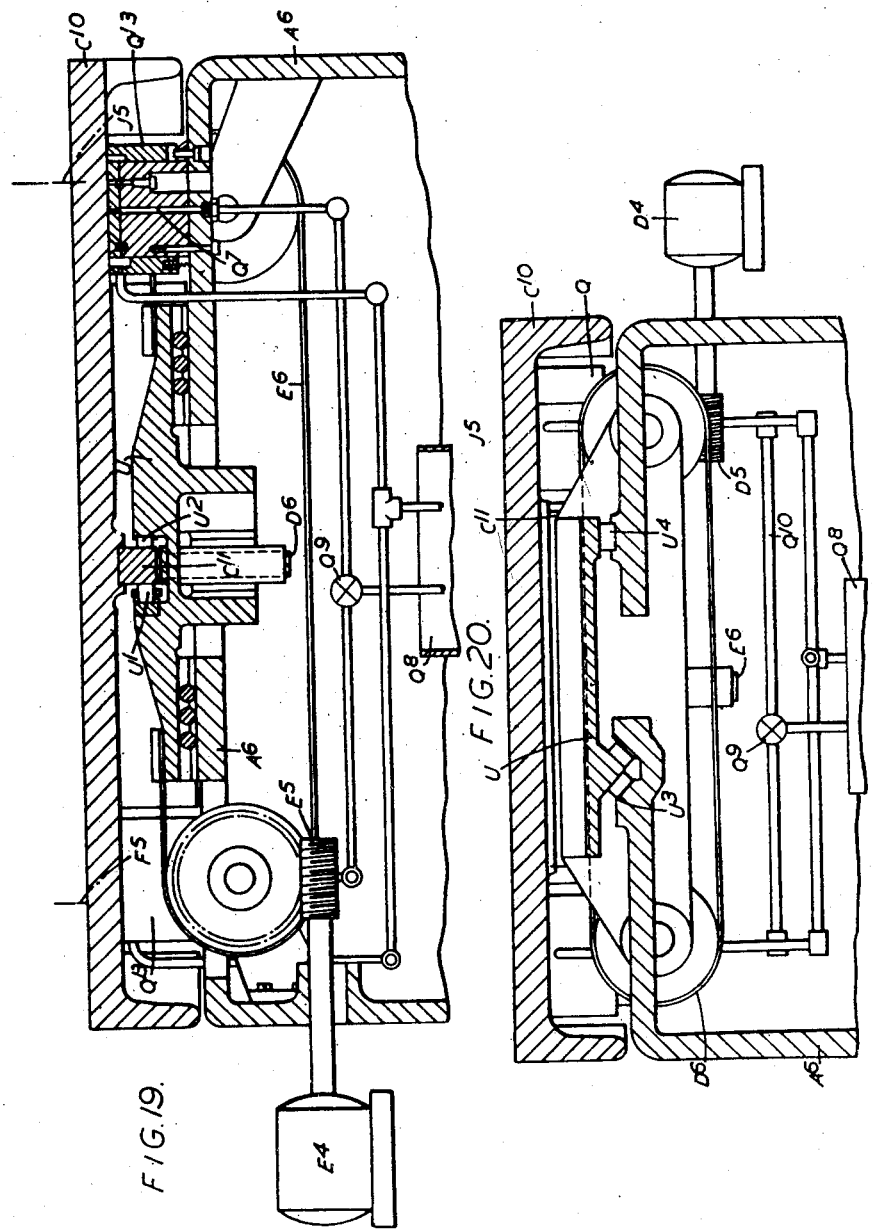

May 11, 1948.    E. A. COOKE    2,441,549
COPYING MACHINE
Filed April 5, 1946    11 Sheets-Sheet 11

Inventor
ERNEST A. COOKE
By
Emery, Holcombe & Blair
Attorney

Patented May 11, 1948

2,441,549

UNITED STATES PATENT OFFICE 2,441,549

COPYING MACHINE

Ernest Albert Cooke, Leicester, England, assignor to Taylor, Taylor & Hobson Limited, Leicester, England, a company of Great Britain Application April 5, 1946, Serial No. 660,007
In Great Britain March 23, 1945

20 Claims. (Cl. 51—100)

This invention relates to copying machines of the type comprising rotary work and copy supports, a support for a tool which is to operate on the work carried by the work support, a support for a tracer or pick-up which follows the outline of a sample, pattern or master profile carried by the copy support, and means interconnecting the supports whereby relative movement between the tool and work supports is a reproduction of the relative movement between the tracer and copy supports.

The main object of the invention is to provide an improved construction of such machine which will be particularly, though not exclusively, suitable for shaping curved forms of irregular contour, such for example as cams, and turbine blades. A further object of the invention is to reduce to a minimum the manual operations necessary during copying whilst at the same time overcoming difficulties which may arise as a result of alteration in the dimensions of the tool due to wear or dressing.

In a copying machine according to the invention the tracer or pick-up comprises a pivoted straight edge or beam which bears tangentially against the master profile carried by the copy support, and control means are provided whereby relative translational adjustments between the tool support and work support are controlled in accordance with angular deflection of the beam about its fulcrum from a position parallel to a primary plane and relative translational movement between the fulcrum and the primary plane in a direction normal to such plane.

Preferably the relative translational adjustments of the work and tool supports effected by the control means are accompanied by corresponding relative adjustments between the fulcrum and the point of contact of the master profile with the beam, so that the adjustments effected by the control means tend to restore the said point of contact into a position of coincidence with the fulcrum whereby the beam is also restored to the position parallel to the primary plane.

Figure 2:
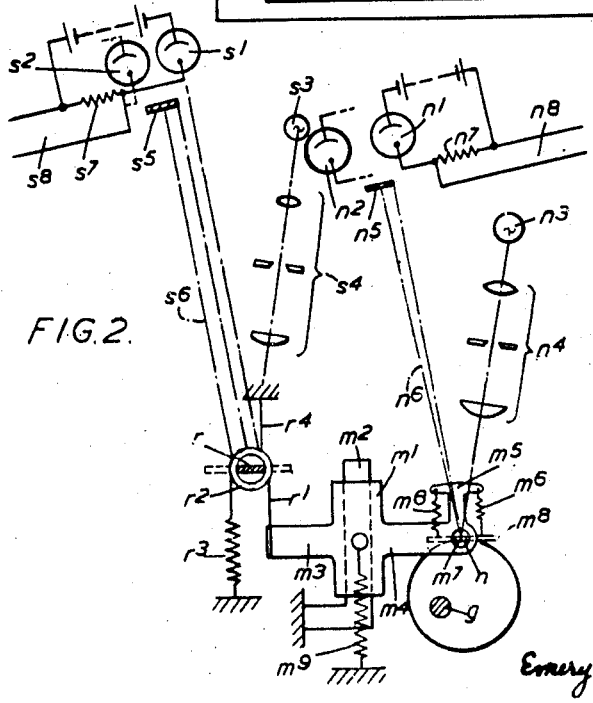

The invention may be carried into practice in various ways but some convenient practical arrangements, each embodying the invention, are shown by way of example in the accompanying drawings, in which Figure 1 is a diagrammatic plan of a simple form of copying machine having one form of the invention applied thereto, Figure 2 shows, also diagrammatically, photoelectric control apparatus which may be associated with the pick-up unit included in Figure 1, Figure 3 is a diagram illustrating the basic principle of the invention employing, for example, the photoelectric control shown in Figure 2, Figure 4 represents diagrammatically one form of electro-magnetic control apparatus which may be employed instead of the photoelectric arrangement of Figure 2, Figure 5 is a fragmentary and diagrammatic illustration of part of Figure 4 but with one of the electromagnetic elements modified.

Figure 6:
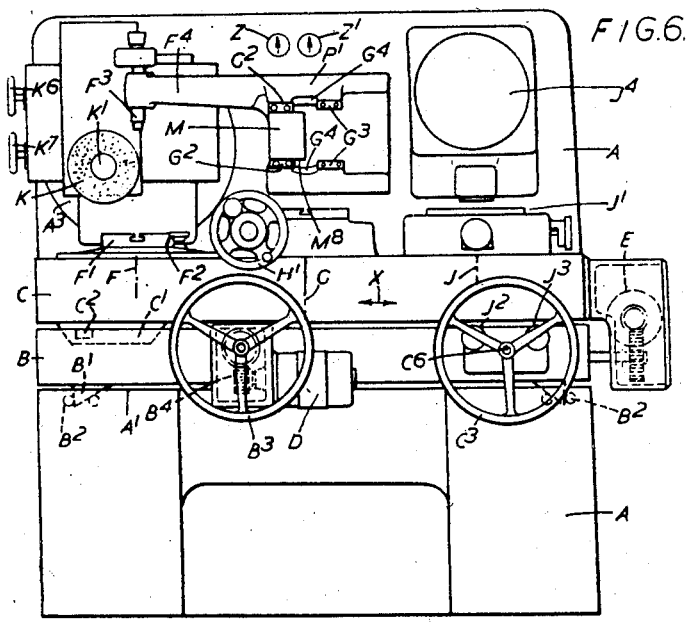
Figure 7:
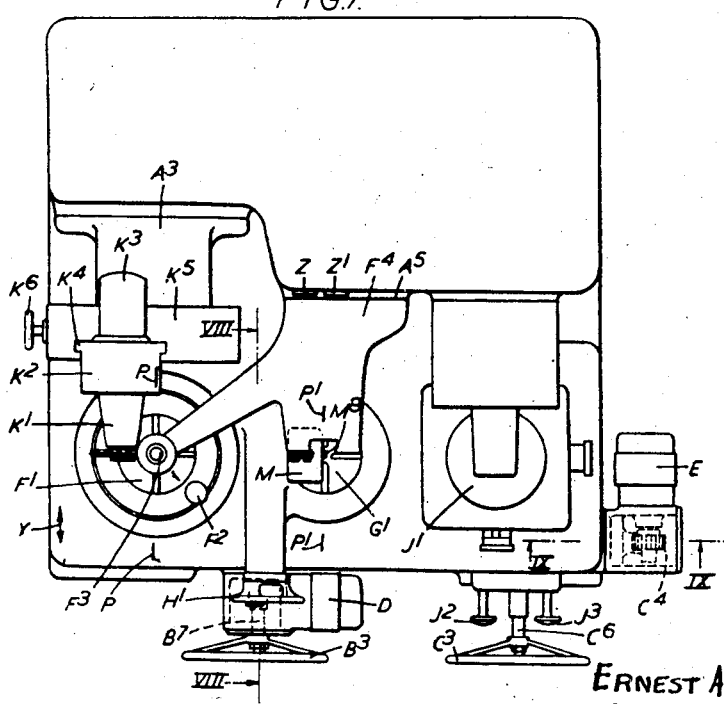
Figure 16:
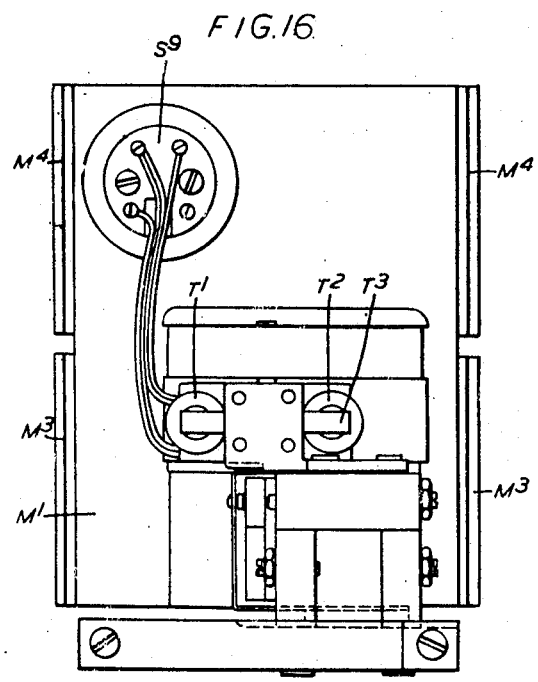
Figure 17:
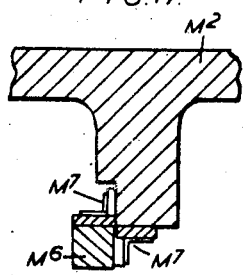
Figure 18:
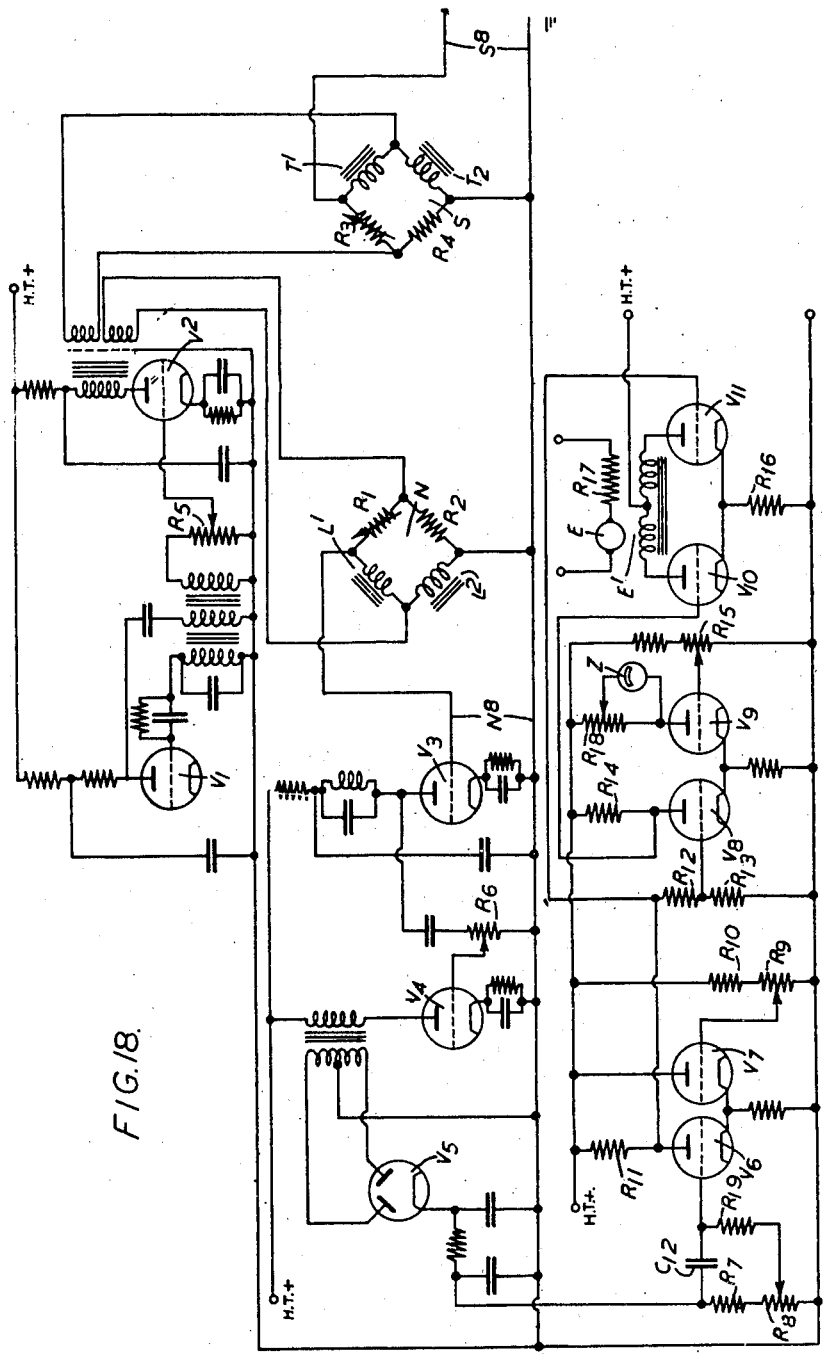
Figure 21:
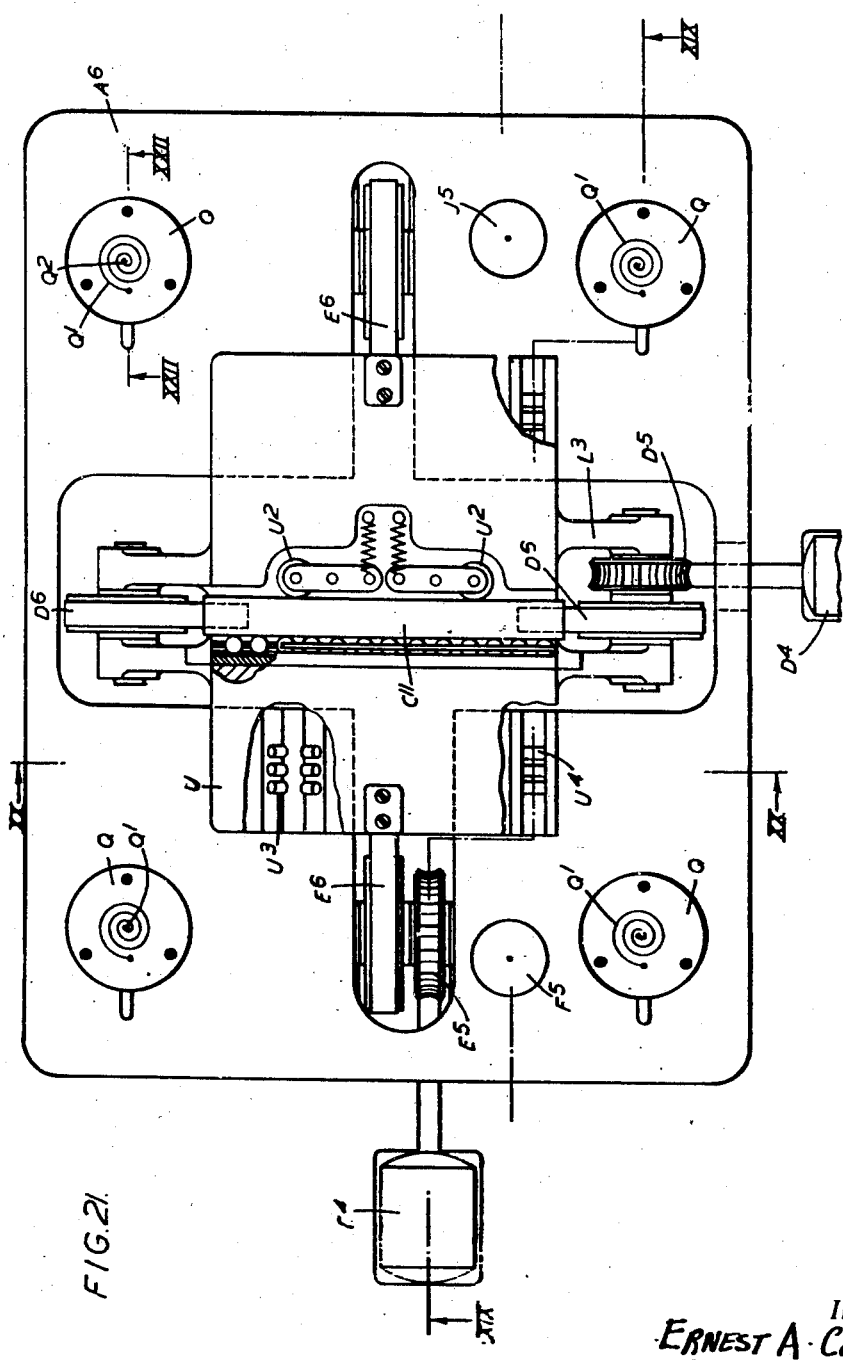

Figures 6 and 7 show, in front elevation and plan respectively, a practical construction of copying machine with a pick-up as shown in Figure 5 embodied therein, Figures 8 and 9 are sections on the lines VIII—VIII and IX—IX of Figure 7 respectively, Figure 10 is a fragmentary plan, on an enlarged scale, of the pick-up casing included in Figures 6 and 7, Figure 11 shows the pick-up unit, on a yet larger scale, as viewed from right to left in Figure 10 and with part of the inner and outer casings cut away, Figure 12 is a view, taken in the same direction as Figure 11, of the pick-up mechanism detached from its inner casing, Figure 13 is a bottom plan of Figure 12, Figure 14 shows the part of the pick-up mechanism making the angular coordinate measurement and as viewed on the line XIV—XIV of Figure 11, Figure 15 illustrates the part of the pick-up mechanism making the translational coordinate measurement and as viewed in the same direction as that of Figure 12 but with the main spring ligaments detached, Figure 16 is a view from right to left of Figure 15, Figure 17 shows, in section on the line XVII—XVII of Figure 14, the spring ligament support for the beam arm, Figure 18 is an electrical diagram of the control circuit associated with one of the electric motors included in Figures 6 and 7, Figure 19 illustrates, on the line XIX—XIX of Figure 21, a modified arrangement of the main carriage which may be substituted for that shown in Figures 6 and 7, Figure 20 is a section on the line XX—XX of Figure 21, Figure 21 shows the modified carriage arrangement in plan but with the carriage proper detached, and Figure 22 is a section on the line XXII—XXII of Figure 21, but on a larger scale.

As shown in Figure 1, the machine comprises a base or pedestal $a$ whose upper surface $a^1$ constitutes a fixed slide or table top i. e. the horizontal datum plane parallel to which the relative movements of the tool and work take place as hereinafter described. Mounted on the table top $a^1$ is a basic slide $b$ having on its lower surface four bearing strips $b^1$ which cooperate with four sets of guide rollers $b^2$ carried by the base $a$, as described in the specifications of United States of America patent applications Serial Nos. 553,067, filed September 7, 1944, and 555,180, filed September 21, 1944, standing in the name of the present applicant. A main carriage $c$ is similarly furnished with four bearing strips $c^1$ cooperating with four sets of guide rollers $c^2$ carried by the basic slide $b$, the bearing strips $c^1$ beneath the main carriage $c$ extending in directions normal to the strips $b^1$ beneath the basic slide $b$. Thus, by translational adjustments of the slide $b$ and carriage $c$, the latter can be adjusted in all directions parallel to the horizontal datum plane or table top $a^1$ whilst the carriage $c$ always remains parallel to itself.

The basic slide $b$ is adjusted by two electric motors $d$, $d^1$, whilst the main carriage $c$ is adjusted by two electric motors $e$, $e^1$, each motor transmitting movement to the associated slide $b$ or carriage $c$ through a worm, worm wheel and releasable coupling as described below.

The carriage $c$ is adjustable on the one hand in accordance with a first coordinate $x$, namely from left to right, and vice versa, parallel to the front of the machine, and a second coordinate $y$ which is at right angles to the first coordinate $x$, both coordinate adjustments being parallel to the horizontal datum plane or table top $a^1$.

Horizontally spaced apart on the main carriage $c$ in a direction parallel to the first coordinate $x$ are the bearings for a rotary work shaft $f$ and a rotary copy shaft $g$, these two shafts $f$ and $g$ being thus angularly adjustable about vertical axes at right angles to the horizontal datum plane. The work and copy shafts $f$ and $g$ are interconnected by flexible transmission tapes $h^4$ so that the two shafts $f$ and $g$ will turn about their vertical axes in synchronism when a hand wheel $h^1$, connected to the copy shaft $g$ through a worm $h^2$ and worm wheel $h^3$ mounted on the carriage $c$, is operated. The work and copy shafts $f$ and $g$ respectively carry a work table $f^1$ and a copy table $g^1$, the work table $f^1$ being, if desired, angularly adjustable relatively to the work shaft $f$ as described in the specification of United States of America patent application No. 555,180, whilst the work shaft $f$ and table $f^1$ may be vertically adjustable, that is to say normal to the datum plane $a^1$.

Carried on the base or pedestal $a$ of the machine is a grinding wheel $k$ whose rotary shaft $k^1$, driven by an electric motor $k^2$, is arranged vertically. The motor $k^2$ and grinding wheel $k$ can be horizontally adjusted as a unit by a spindle $k^3$ in a direction parallel to the plane of the grinding wheel $k$ for the purpose of setting the operative edge of the grinding wheel accurately in a "primary plane" $p$—$p$, i. e. a vertical plane in which the tool $k$ meets the work. For the purpose of accurately maintaining the operative edge of the grinding wheel $k$ in the primary plane $p$—$p$, a work microscope (not shown) is mounted on the base $a$ of the machine with the cross lines or origin of this microscope lying accurately in the primary plane $p$—$p$. The arrangement is such that when the grinding wheel $k$ has been adjusted so that its operative edge lies accurately in alignment with the origin of the work microscope, that is to say in the primary plane $p$—$p$, and the carriage $c$ has been adjusted into its zero translational position, the axis of the work shaft $f$ lies in alignment with the origin of the work microscope whilst the axis of the copy shaft $g$ also lies accurately in the primary plane $p$—$p$, a line joining the axes of the work and copy shafts $f$ and $g$ then lying accurately in the primary plane $p$—$p$.

Mounted on the base $a$ of the machine, adjacent to the copy table $g^1$ when the carriage $c$ is in its zero position, is a tracer or "pick-up" unit $m$ comprising a carrier member or subsidiary slide $m^1$ (Figure 2) which is movable along guides $m^2$ at right angles to the primary plane $p$—$p$, this subsidiary slide $m^1$ having two lateral lugs $m^3$, $m^4$, extending respectively from opposite sides of the slide $m^1$ and approximately at right angles to the associated guides $m^2$. The lateral lug $m^4$ has a transverse T-piece $m^5$ the two ends of the cross limb of which constitute anchorages for two balancing springs $m^6$ connected, on opposite sides respectively of its fulcrum $m^7$, to a straight edge or beam $m^8$ fulcrumed on the said lateral lug $m^4$. With a view to eliminating shake and friction, the beam $m^8$ is mounted on flexible ligament pivots as fully described below. The balancing springs $m^6$ thus tend to maintain the operative part or straight edge of the beam $m^8$ accurately parallel to the primary plane $p$—$p$ whilst a loading spring $m^9$ acting on the subsidiary slide $m^1$ tends to move the slide, and therefore the beam $m^8$ carried thereby, at right angles to the primary plane $p$—$p$ and towards the front of the machine.

The beam $m^8$ carries a deflecting device, such for example as a mirror $n$ (or a prism), so that when the beam $m^8$ turns about its fulcrum $m^7$ corresponding angular adjustment of the mirror $n$ takes place about the axis of the fulcrum $m^7$. Mounted, preferably so as to move as a unit with the subsidiary slide $m^1$, are two photo-electric cells $n^1$, $n^2$, and an electric lamp $n^3$ from which light is transmitted through a suitable optical system $n^4$ on to the mirror $n$ carried by the beam $m^8$. The two photoelectric cells $n^1$, $n^2$ are horizontally spaced apart with a suitable intermediate mask $n^5$ between them so that when the beam $m^8$, and therefore the mirror $n$, is in its central or zero position, that is to say with the straight edge parallel to the primary plane $p$—$p$, the light beam $n^6$ from the mirror $n$ lies between the cells $n^1$, $n^2$, and neither is energised. Should, however, the pivoted beam $m^8$ be deflected angularly from the said zero position in one direction or the other, the light beam $n^6$ from the mirror $n$ will be moved so as to be incident upon one or other of the cells $n^1$, $n^2$ respectively, the amount of light incident upon the cell being in accordance with the degree of the said deflection of the pivoted beam $m^8$. Each of these two photoelectric cells $n^1$, $n^2$ (hereinafter referred to as the "first coordinate" cells) has the usual load $n^7$ applied thereto, the circuit being shown only for the cell $n^1$ since the connections are the same for each of the cells $n^1$, $n^2$. The loads $n^7$ of the cells $n^1$, $n^2$ are respectively connected across the input terminals of two thermionic amplifiers $o^1$ by leads $n^8$. The outputs from the two amplifiers $o^1$ are respectively applied to the field windings of the two electric motors $e$, $e^1$ for effecting translational adjustments of the carriage $c$ in accordance with the first coordinate $x$, that is to say parallel to the primary plane $p$—$p$. Thus, when one of the two first coordinate cells $n^1$ or $n^2$ is energised the output current from the corresponding amplifier $o^1$ is applied to the associated motor $e$ or $e^1$ so that the carriage $c$ is adjusted in one direction parallel to the primary plane $p$—$p$, whereas when the other first coordinate cell $n^2$ or $n^1$ is energised the output current from the associated amplifier $o^1$ is applied to the second motor $e^1$ or $e$ which then adjusts the carriage $c$ in the reverse direction parallel to the primary plane $p$—$p$.

For the second coordinate adjustment $y$, that is to say at right angles to the primary plane $p$—$p$, the second lateral lug $m^3$ on the subsidiary slide $m^1$ has anchored thereto one end of a flexible steel driving tape $r^1$ which laps the central portion of an angularly adjustable roller $r^2$ stepped at its two ends, the other end of the driving tape $r^1$ being connected through a tension spring $r^3$ to a fixed part. Translational movement of the subsidiary slide $m^1$ at right angles to the primary plane $p$—$p$ thus causes corresponding angular movement of the stepped roller $r^2$, i. e. angular movement in accordance with the second coordinate $y$ represented by the translational movement of the fulcrum $m^7$ of the pivoted beam $m^8$ normal to the primary plane $p$—$p$. The stepped roller $r^2$ is supported by two flexible steel tapes $r^4$ each of which is anchored at one end to a fixed part and has its other end wrapped round one end of the roller $r$, that is to say at its minor diameter. Mounted on the roller $r^2$ is a deflecting device, such for example as a mirror $r$ (or prism), which cooperates with an electric lamp $s^3$ and one or other of two photoelectric cells $s^1$ and $s^2$ (hereinafter referred to as the "second coordinate" cells) the light from the lamp $s^3$ being directed on to the mirror $r$ through a suitable optical system $s^4$. Thus, as the fulcrum $m^7$ of the pivoted beam $m^8$ and therefore the subsidiary slide $m^1$, moves normal to the primary plane $p$—$p$ in one direction or the other, this translational movement is multiplied by the roller $r^2$ and converted into angular movement whereby the amount of light, from a beam $s^6$ passing a mask $s^5$ between the two second coordinate cells $s^1$, $s^2$, so as to be incident upon one or other of these cells, will vary in accordance with the said translational movement of the fulcrum $m^7$. The loads $s^7$ of the second coordinate cells $s^1$, $s^2$, are connected by leads $s^8$ across the input terminals of two amplifiers $o^2$ each as described above, the output currents from the amplifiers $o^2$ being applied to the field windings of the two electric motors $d$, $d^1$, for adjusting the main carriage $c$ at right angles to the primary plane $p$—$p$.

Assuming that it is desired to copy, for example, a master cam $v$, (or to true or check a work piece $w$ in accordance with the profile of such master $v$) the master cam $v$ is secured in position on the copy table $g^1$ (as shown in Figure 1) and the work piece $w$ is secured to the work table $f^1$. Having ensured that the operative edge of the grinding wheel $k$ lies accurately in the primary plane $p$—$p$, the carriage $c$ is adjusted (by separate hand wheels $b^3$, $c^3$ for this purpose) until the point of contact between the profile of the master cam $v$ and the pivoted beam $m^8$ lies in alignment with the fulcrum $m^7$ of the beam. For this purpose a copy microscope may be mounted on the fixed part of the machine with the origin of the copy microscope graticule lying accurately in the primary plane $p$—$p$. This microscope will also serve to facilitate adjustment of the carriage $c$ which will bring the said point of contact initially into the primary plane $p$—$p$. In this respect it will be understood that the hand wheels $b^3$, $c^3$ for manual adjustment of the carriage $c$ will be such that they can be rendered operative or inoperative at will, as described below.

Having thus initially set the machine the grinding wheel $k$ is set in operation and grinding of the work piece $w$ takes place in the primary plane $p$—$p$ corresponding to the part of the master cam $v$ lying at the point of contact with the pivoted beam $m^8$. Since the pivoted beam $m^8$ is now in its zero position both as regards its angular position about the fulcrum $m^7$ and as regards the translational position of the fulcrum relatively to the primary plane $p$—$p$, none of the photoelectric cells $n^1$, $n^2$, $s^1$, $s^2$, is energised and the electric motors $d$, $d^1$, $e$, $e^1$ are inoperative. Grinding now proceeds by operation of the handwheel $h^1$ for turning the work and copy supports $f$ and $g$ about their axes in synchronism. As the copy support $g^1$ turns, say, through the angle $i^1$ (Figure 3), to bring a new point on the master cam $v$ into contact with the beam $m^8$ this point of contact will tend to shift relatively to the fulcrum $m^7$ of the beam $m^8$ to one side or the other thereof in accordance with the eccentricity of the said point on the master cam $v$. The pivoted beam $m^8$ will, as a result, be angularly deflected through the angle $i^2$ about its fulcrum $m^7$ in accordance with the momentary relative displacement between the point of contact with the beam $m^8$ and the fulcrum $m^7$ thereof in a direction parallel to the primary plane $p$—$p$, whilst the fulcrum $m^7$ of the beam $m^8$ will move translationally at right angles to the primary plane $p$—$p$ through the distance $y$. The angular displacement $i^2$ corresponds to the linear displacement $x$ parallel to the primary plane, these two mutually perpendicular movements constituting respectively the first and second coordinates $x$ and $y$ representing the new position of the said point of contact.

The angular movement $i^2$ of the pivoted beam $m^8$ will cause corresponding energisation of the appropriate first coordinate photoelectric cell $n^2$ with consequent energisation of the associated electric motor $e^1$ which acts to adjust the carriage parallel to the primary plane $p$—$p$ so as to bring the point of contact back into coincidence with the fulcrum $m^7$ whereupon the said cell $n^2$ is again deenergised and the associated motor $e^1$ stops. The translational movement of the fulcrum $m^7$ normal to the primary plane has now caused translational adjustment of the subsidiary slide $m^1$ through the distance $y$ whereby the stepped roller $r^2$ is turned accordingly by the driving tape $r^1$ so as to energise the appropriate second coordinate cell $s^1$ whose motor $d^1$ then adjusts the carriage $c$ at right angles to the primary plane through the distance $y$, i. e. until the said cell $s^1$ is again deenergised due to the fulcrum $m^7$ of the beam $m^8$ having returned to the zero position in the primary plane $p$—$p$.

Accurate grinding of the work piece $w$ in accordance with the master profile $v$ thus proceeds by the operation of the one hand wheel $h^1$ namely that connected to the copy shaft $g$.

Instead of employing photoelectric cells for controlling the coordinate adjustments, an electromagnetic control may be utilised. In one such arrangement, as shown in Figure 4, the pivoted beam $m^8$ constitutes an armature which moves relatively to two balanced coils $l^1$, $l^2$ of an electromagnetic control device $l$, for example as described in the specification of United States Patent No. 2,365,592, the two coils $l^1$, $l^2$ being carried by the lateral lug $m^4$ of the subsidiary slide $m^1$ carrying the beam fulcrum $m^7$. The two coils $l^1$, $l^2$, i. e. the "first coordinate" coils, constitute two arms of a bridge connected to a full wave rectifier whose output terminals are connected to an amplifier as above described. Similarly, for the second coordinate adjustment, the stepped roller $r^2$ carries an armature $t^3$ which is movable relatively to two balanced coils $t^1$, $t^2$ of an electromagnetic control device $t$, these two coils $t^1$, $t^2$ constituting two arms of a bridge connected to a full wave rectifier whose output terminals are connected to the associated amplifier. According to the modification of this arrangement shown in Figure 5, the armature $t^4$ is carried directly by the lateral lug $m^3$ of the subsidiary slide $m^1$ so that the armature $t^4$ moves, relatively to the two balanced coils $t^1$, $t^2$, as a unit with the subsidiary slide $m^1$.

It will be apparent that the length of the beam $m^8$ will be determined to suit the radii of curvature to be reproduced since, obviously, both for reasons of inertia and cooperation between the beam and the master the beam will usually be made as short as may be practicable. In Figures 1 to 4 the length of the beam has been shown very much exaggerated solely for facilitating illustration and description, a beam having a length of half an inch or even less being more normal in practice.

One practical embodiment of the invention, as applied to the copying machine forming the subject of United States of America patent application Serial No. 555,180 and employing an electromagnetic pick-up similar to that described above with reference to Figure 5 is shown by way of example in Figures 6 to 9. In this construction the machine comprises a fixed base or pedestal A whose upper surface $A^1$ constitutes a table top, i. e. the horizontal datum plane parallel to which the relative movements of the tool and work take place, as hereinafter described. Mounted on the table top $A^1$ is a basic slide B having on its lower surface four bearing strips $B^1$ which cooperate with four sets of guide rollers $B^2$ carried by the base A. A main carriage C is similarly furnished with four bearing strips $C^1$ cooperating with four sets of guide rollers $C^2$ carried by the basic slide B, the bearing strips $C^1$ extending in directions normal to the strips $B^1$. Thus, by translational adjustments of the slide B and carriage C, the latter can be adjusted in all directions parallel to the horizontal datum plane $A^1$ whilst the carriage C always remains parallel to itself.

The slide B is adjusted by a reversible electric motor D whilst the main carriage C is adjusted by a reversible electric motor E. As shown in Figure 8, the motor D is coupled to the slide B through a worm $B^4$ and wormwheel $B^5$, the wormwheel $B^5$ being secured to a rotary sleeve $B^6$ which is internally screwthreaded to cooperate with an externally screwthreaded shaft $B^7$ anchored to, but rotatable in, a bearing bracket $B^8$ carried by the base or pedestal A. The basic slide B can therefore be adjusted either by the motor D or by a handwheel $B^3$ secured to the shaft $B^7$, this differential feature rendering it possible for the operator to superimpose small movements upon those applied by the motor D so that, if desired, a correction or distortion of the adjustment applied by the motor may be applied at will.

As shown in Figure 9, the motor E is carried by the main carriage C and is coupled to the slide B through a worm $C^4$ and wormwheel $C^5$ secured to an externally screwthreaded shaft $C^6$ whose screwthread cooperates with an internally threaded rotary sleeve $C^8$ carried by a bearing bracket $B^9$ on the basic slide B. The sleeve $C^8$ has an external wormwheel $C^9$ which cooperates with a worm on a shaft $C^7$ to which is secured a handwheel $C^3$. Thus, as for the basic slide B, the operator can, by means of the handwheel $C^3$, superimpose adjustments on those applied to the carriage C by the corresponding motor E.

From the above description it will be apparent that the carriage C is adjustable on the one hand by the motor E and/or the handwheel $C^3$ in accordance with a first coordinate X, namely from left to right and vice versa as viewed in Figure 6 parallel to the front of the machine, and on the other hand by the motor D and/or the handwheel $B^3$ in accordance with a second coordinate Y, namely from back to front of the machine and vice versa, the coordinates X and Y being at right angles to each other.

Horizontally spaced apart on the main carriage C in a direction parallel to the first coordinate X are the bearings for a rotary work shaft F, a rotary checking shaft J and a rotary control shaft G, these three shafts being thus angularly adjustable about vertical axes at right angles to the horizontal datum plane $A^1$. The three shafts F, G and J which are indicated only by their axes in Figure 6, are interconnected by toothed gearing or by flexible transmission tapes as described in the specification of the said United States of America Patent Application Serial No. 555,180 so that the three shafts will turn about their vertical axes in synchronism when a handwheel $H^1$, connected to the control or copy shaft G through a worm and wormwheel, is operated. The work shaft F and copy shaft G respectively carry a work table $F^1$ and a copy table $G^1$, the work table $F^1$ being angularly adjustable relatively to the work shaft F by means of a control knob $F^2$ as described in the said specifications, the work shaft F and table $F^1$ being, if desired, vertically adjustable, that is to say normal to the datum plane $A^1$.

The form and arrangement of the tool for operating on the work-piece carried by the work table will vary in accordance with the nature of the work. For example, when grinding the profiles of turbine blades wherein the aerofoil section grows out of the root of the blade so as to form a shoulder, a grinding wheel, such as the wheel $k$ described with reference to Figure 1, rotating about a vertical axis will be employed. For many other purposes, however, a grinding wheel rotating about a horizontal axis will prove satisfactory. Whether the grinding wheel rotates about a vertical or about a horizontal axis, an intermittent vertical traverse of the grinding wheel will usually be required instead of the smooth full-stroke traverse normally employed. Further, it may in some instances be desirable to provide means for effecting an intermittent vertical feed motion to the pick up, this feed motion being synchronised with the vertical traverse of the tool or grinding wheel. When the copying machine is to generate a convex curve on the work, the grinding wheel may be of cylindrical form at its operative edge, but when a concave curve is to be generated the said edge will be radiused to a value less than that of the curve to be generated. It will be noted that in Figures 6 to 9 the grinding wheel K rotates about a horizontal axis and the primary plane P—P instead of being parallel to the front of the machine is at right angles thereto, the direction of this primary plane being immaterial provided only, as described below, that the beam of the pick-up unit when in its zero position lies parallel to the primary plane.

The shaft $K^1$ of the grinding wheel K constitutes part of a unit $K^2$ (including the motor $K^3$ for driving the grinding wheel) which is vertically reciprocated, over a small amplitude, in guides $K^4$ formed in a slide $K^5$ horizontally adjustable by means of a handwheel $K^6$ on a boss $A^3$ carried by the pedestal A. The whole of the grinding wheel unit can be intermittently adjusted vertically by means of a handwheel $K^7$ to vary the level at which the short reciprocating movement of the grinding wheel K takes place.

A work microscope $F^3$ is carried by a bracket $F^4$ secured to the fixed pedestal A at the back of the machine, the bracket $F^4$ being secured to a vertical facing $A^5$ which may serve alternatively to carry the spigot linkage of the machine described in the specification of United States of America patent application Serial No. 555,180. The bracket $F^4$ carries an electromagnetic pick-up unit arranged in a casing M which can be secured to either of two locating facings $G^2$ or $G^3$ according to whether the master or pattern (carried by the table $G^1$) has a convex or concave curvature to be reproduced on the work carried by the work table $F^1$. The bracket is cut away as shown at $G^4$ so as to ensure the necessary clearance for the pick-up beam $M^8$ whether the pick-up unit M is mounted on the locating facing $G^2$ or the locating facing $G^3$.

The checking table or frame $J^1$, which is furnished with the fences, control grid, fixed and inclined movable graticules (operated by the knobs $J^2$, $J^3$) as described in the specifications above referred to, is not essential to the present invention but is included partly because this earlier machine readily lends itself for the application of the invention thereto so that the machine will be adaptable either for projection copying (including circular arc grinding) or for direct copying by means of the present invention, and partly because during copying of a convex or concave pattern arranged on the control table $G^1$ accuracy of operation of the machine can be progressively checked by the operator by arranging on the table or frame $J^1$ a transparency bearing a facsimile of the outline to be reproduced and checking the relative positions of the fixed scale origin, associated with the frame $J^1$, against the said outline as projected on the screen $J^4$.

The pick-up unit is shown in Figures 10 to 17. The pick-up unit comprises two carrier members or frames $M^1$ and $M^2$ supported by two pairs of spring ligaments $M^3$ and $M^4$, the ligaments $M^4$ being carried by a member $M^5$ secured to the inner casing $M^{11}$ mounted within the outer casing M. The frame $M^1$ is shown in Figures 15 and 16 whilst the frame $M^2$ is shown in Figure 14. The tilting beam or straight edge pick-up $M^8$ is mounted on an arm $M^6$ secured by three spring ligaments $M^7$ on the frame $M^2$ as shown in Figure 17, these ligaments constituting a frictionless pivot for oscillation of the arm $M^6$ about its longitudinal axis $M^{10}$. It will be observed that the axis $M^{10}$ is inclined to the vertical plane $P^1$—$P^1$ which is parallel to the primary plane P—P so as to avoid undesirable limitation of the length of form which can be explored, transversely to the horizontal, by the beam $M^8$. The upper end of the arm $M^6$ carries an armature L which cooperates with two balanced coils $L^1$, $L^2$, carried by the frame $M^2$. The balanced coils $L^1$, $L^2$ correspond to the coils $l^1$, and $l^2$ of Figure 4 described above, unbalance of these coils due to tilting of the beam $M^8$ producing adjustment in accordance with the first coordinate X. The pivot for the Y coordinate displacement, that is to say in accordance with translational movement of the beam $M^8$, is clearly shown in Figures 13 and 15 and is carried by the frame $M^1$. To this end, a plate $T^4$ connected to the frame $M^1$ by spring ligaments $T^5$ is urged against a button $T^6$, carried by the frame $M^2$, by a leaf spring $T^7$ so that translational movement of the beam $M^8$ at right angles to the plane $P^1$—$P^1$ will cause the frame $M^2$ to move and thus retract the button from the plate $T^4$ which is thus turned (in the clockwise direction as viewed in Figure 13) about its ligament pivot $T^5$. The plate $T^4$ thus moves an armature $T^3$ relatively to two balanced coils $T^1$, $T^2$, which correspond to the coils $t^1$, $t^2$ in Figure 4 and produce adjustment in accordance with the second coordinate Y. It should be noted that the purpose of the spring ligaments $M^3$ is to provide the necessary resilient yield should the movement of the pick-up arm tend to exceed a predetermined safe limit. In this respect, the spring $T^8$ (Figure 13) acts between the two frames $M^1$ and $M^2$ whilst the spring $T^9$ acts as an overload spring between the frame $M^2$ and the fixed member $M^5$. The electric input and output leads are taken in through a common multipoint-plug $N^8$, $S^8$ connected to the coils $L^1$, $L^2$, $T^1$, $T^2$, through plug and socket couplings $N^9$, $S^9$.

The A. C. voltage as controlled by each pair of balanced coils $L^1$, $L^2$, and $T^1$, $T^2$, will be proportional to the associated displacement, namely the angular movement of the beam $M^8$ about the axis $M^{10}$ (coordinate X) and the translational movement of the beam transversely to the primary plane P—P. These A. C. control signals are then raised by conventional thermionic valve amplifiers to a level suitable for controlling the current fed to the field circuits of the motors D and E. The power to be developed by these motors will, in the main, be constituted by that necessary to overcome inertia forces due to acceleration of the slide B and carriage C. Thus, displacements from the condition of equilibrium will be proportional to the instantaneous acceleration of the slide B and carriage C.

The control circuit is the same for each of the two bridge circuits shown in Figure 18 so that only one of the two control circuits is therefore shown. The bridge N includes the two coils $L^1$, $L^2$ of the pick-up whilst the bridge S includes the two coils $T^1$, $T^2$, of the pick-up. The bridges N and S have adjustable resistances $R^1$, $R^3$, and fixed resistances $R^2$, $R^4$. Both bridge circuits N and S are fed with alternating current, at a frequency of the order of 5 kilocycles, from an oscillator $V_1$ and amplifier $V_2$, the voltage applied to the circuits being determined by the setting of a resistance $R^5$ in the grid circuit of the amplifier $V_2$.

The bridge N is given an initial out of balance by suitably adjusting the resistance $R_1$ relatively to the resistance $R_2$. Displacement of the armature L associated with the first coordinate X will now cause the reactances of the coils $L^1$ and $L^2$ to increase and decrease respectively, or vice versa, according to the direction of swing of the armature $M^8$ about the axis $M^{10}$. This will result in the original A. C. voltage from the bridge M increasing or decreasing, according to the said direction of swing of the beam $M^8$. The output from the bridge N is applied, through the leads N[8], to the amplifying valves $V_3$ and $V_4$, the valve $V_3$ having an anode load tuned to the frequency of the oscillator to enable a high signal-to-noise ratio to be achieved. The output from the valve $V_4$, which can be determined by adjusting the resistance $R_6$, is rectified by the double diode $V_5$ and will appear across the resistances $R_7$ and $R_8$ as a D. C. voltage. A fraction of this voltage, depending upon the effective value of the adjustable resistance $R_8$, is fed to the differential circuit including the valves $V_6$ and $V_7$. The D. C. voltage applied to the grid of the valve $V_7$ is adjusted by means of the variable resistance $R_9$ until the said D. C. voltage is substantially equal to that applied to the grid of the valve $V_6$ due to the original out of balance of the bridge N. The relative values of the resistances $R_9$ and $R_{10}$ are so selected that when the resistances $R_8$ and $R_9$ are ganged and moved together, the voltage across the anode load $R_{11}$ of the valve $V_6$ will remain substantially constant. The anode voltage of the valve $V_6$ is applied to the grid of the valve $V_8$ by the dividing network $R_{12}$ and $R_{13}$, the value of the resistance $R_{12}$ divided by the value of the resistance $R_{13}$ being equal to the gain obtained from the valve $V_8$. By means of the resistance $R_{15}$ the anode voltage of the valve $V_8$ is adjusted so as to be substantially equal to the anode voltage of the valve $V_6$. The anodes of the valves $V_6$ and $V_8$ are connected to the grids of two power valves $V_{10}$ and $V_{11}$ which supply current to the high-resistance centre-tapped field winding $E^1$ of the driving motor E. The negative grid voltages required by the valves $V_{10}$ and $V_{11}$ are obtained by raising the potential of their cathodes by means of a resistance $R_{16}$.

The armature of the motor E is supplied with direct current through a series resistance $R_{17}$ which is large as compared with the D. C. resistance of the armature. The series resistance $R_{17}$ enables the speed of the motor E, as well as the torque, to be directly proportional to the strength of the field. The motor field is reduced to zero by final adjustment of the resistance $R_{18}$, whereupon the resistance $R_{18}$ is adjusted until the meter Z reads half maximum current, this reading being made an arbitrary zero on the meter scale.

By means of the circuit of Figure 18 associated with the bridge N (another and identical circuit being associated with the bridge S and motor D) a displacement applied to the beam $M^8$ will result in the currents through the two sections of the motor field $E^1$ increasing and decreasing respectively, causing the motor E to develop a torque which will be proportional to the said displacement. The motor torque will change sense with change of sense of the displacement, and the magnitude of the torque, as indicated by the meter Z (or $Z^1$ for the motor $D^1$), will depend upon the setting of the gauged resistances $R_8$ and $R_9$.

The effect of time lag in the system due to the inductance of the motor field winding $E^1$ normally limits the degree of control which could be obtained from the system before "cycling" or "hunting" commenced. This effect is reduced by the resistance capacity network constituted by the resistance $R_{19}$ and condenser $C^{12}$ in the input circuit of the valve $V_6$, a leading voltage, developed across the resistance $R_{19}$ and additional to the control voltage developed across the resistance $R_8$, being thus injected into the system.

The operation of the apparatus as described above with reference to Figures 6 to 18 will be apparent from the description relative to Figures 1 to 5, but it should be noted that to establish zero position of the apparatus shown in Figures 6 to 17, a plug of known diameter is located coaxial with the control shaft G and the carriage C is displaced in the direction X (Figure 6) by an amount equal to the radius of the plug. The zero position of the beam $M^8$ is then obtained by adjusting the pick-up unit M as a whole upon its mounting until a signal of predetermined strength is indicated on an appropriate meter. The plug can then be replaced by the master form or pattern to be reproduced, and grinding can proceed by manual operation of the handwheel $H^1$.

For reproducing concave profiles it is only necessary to transfer the pick-up unit M from the facing $G^2$ to the facing $G^3$ and again zero the apparatus as above described.

It will be understood that instead of employing a basic slide in addition to the main carriage, this carriage may be mounted directly upon the fixed base or pedestal with the interposition of bearing devices. One such arrangement is shown in Figures 19 to 22 wherein the fixed base or pedestal $A^6$ is provided with four bearing devices each comprising a sole plate Q having a spiral groove $Q^1$ leading from a central inlet aperture $Q^2$ to an outlet aperture $Q^3$ determined by a needle valve $Q^4$. The sole plates Q are secured by bolts $Q^5$ to the upper surface of the pedestal $A^6$ through which passages $Q^7$ communicate with the apertures $Q^3$. Fluid, for example oil, delivered under pressure from a reservoir $Q^8$ through a distributing valve $Q^9$ and pipes $Q^{10}$ flows through the passages $Q^7$ and then round the spiral conduits formed by the grooves $Q^1$ between the sole plates Q and the lower surface of the main carriage $C^{10}$ to the outlets $Q^3$. The pressure fluid passing the valves $Q^4$ enters expansion chambers $Q^{11}$ from which it flows to annular chambers $Q^{12}$ formed between the sole plates Q and annular scraper rings $Q^{13}$ which are axially movable (against springs $Q^{14}$) but are held against rotation by studs $Q^{15}$. The fluid is finally discharged from the annular chambers $Q^{12}$ through discharge pipes $Q^{16}$. Thus, a film of the fluid is maintained under pressure between the upper surfaces of the sole plates Q and the under surface of the carriage $C^{10}$.

The carriage $C^{10}$ carries a tenon $C^{11}$ lying between roller bearings $U^1$ and spring loaded rollers $U^2$ mounted on an intermediate floating slide U. The slide U engages a V-guide $U^3$ and a linear guide $U^4$ on the base $A^6$, these guides $U^3$, $U^4$ being at right angles to the tenon $C^{11}$. The main carriage $C^{10}$ is adjusted along the guide $U^1$, $U^2$ by an electric motor $D^4$ acting through a worm $D^5$ and flexible transmission tapes $D^6$, the motor $D^4$ corresponding to the motor D above described. Similarly, the slide U is adjusted along the guides $U^3$, $U^4$ by an electric motor $E^4$ through a worm $E^5$ and transmission tapes $E^6$, the motor $E^4$ corresponding to the motor E above described. The main carriage $C^{10}$ is thus universally adjustable over the sole plates Q in accordance with the two coordinates X and Y. The positions of a work shaft $F^6$ and copy shaft $J^5$ are indicated diagrammatically in Figures 19 and 21.

It will be understood that the constructions and arrangements above described are given by way of example only and that details may be modified to suit requirements. For example, though thermionic amplifiers have been described the output currents controlled by the cells or coils may be applied to the grid circuits of gas discharge tubes of the type sold under the registered trade-mark "Thyratron," the variable mean anode output of each tube being then applied, through appropriate smoothing means, to the corresponding motor or pressure fluid control means. Instead of using either photoelectric cells or electromagnetic control devices the beam may act to vary the pressure on a pressure responsive crystal, e. g. a piezocrystal, or may cause operation of an electrostatic condenser.

According to yet a further arrangement the control of the relative movements between the tool and the work may be effected by electromagnetic couplings of the eddy current type, say, through thermionic amplifiers or through amplifiers employing gas discharge tubes of the type referred to. When adjustments between the tool and the work are effected by electric motors, the movements may be transmitted from the motors, operating at a predetermined speed, through worm and wormwheel gear of the differential type, i. e. wherein worms driven by two motors respectively engage a common worm wheel on diametrically opposite sides thereof so that when the motors are rotating at the same speed the axis of the worm wheel (connected to the main carriage) will remain stationary whereas when the motors rotate at different speeds, this axis, and therefore the carriage, will be moved translationally in accordance with the difference in speed of the two motors. When the control from the straight edge or beam is effected through electromagnetic couplings of the eddy current type, the worms may be coupled to their respective motors through two such couplings. Alternatively, a single constant speed driving motor may be coupled to the carriage through forward and reverse electromagnetic couplings.

Though angular synchronous movement of the work and copy supports is, in the arrangement more specifically described above, effected manually, this rotational or angular oscillation of the supports may be effected by an electric motor through transmission means which can be adjusted to give either complete rotation of the supports or oscillatory movement thereof through any required angular distance.

Since the two coordinate readings are continuously available from the machine these may be applied to an indicator or pen recorder which will thus give an accurate record of the profile, for example relatively to a master curve after the manner of a graphical comparator.

What I claim as my invention and desire to secure by Letters Patent is:

1. A copying machine comprising a rotary work support, a rotary copy or pattern support, a support for a tool which is to operate on the work carried by the work support, a support for a tracer or pick-up for following the outline of a sample, pattern or master profile carried by the copy support, means interconnecting the supports whereby relative movement between the tool and the work supports is a reproduction of the relative movement between the tracer and copy supports, a tracer or pick-up carried by the tracer support and comprising a pivoted straight edge or beam which bears tangentially against the master profile, and control means whereby relative translational adjustments between the tool and work supports are controlled in accordance with angular deflection of the beam about its fulcrum from a position parallel to a primary plane and relative translational movement between said fulcrum and the primary plane in directions normal to said plane.

2. A copying machine comprising a rotary work support, a rotary copy or pattern support, a support for a tool which is to operate on the work carried by the work support, a support for a tracer or pick-up for following the outline of a sample, pattern or master profile carried by the copy support, means interconnecting the supports whereby relative movement between the tool and work supports is a reproduction of the relative movement between the tracer and copy supports, a tracer or pick-up carried by the tracer support and comprising a pivoted straight edge or beam which bears tangentially against the master profile, control means whereby relative translational adjustments between the tool and work supports are controlled in accordance with angular deflection of the beam about its fulcrum from a position parallel to a primary plane and relative translational movement between the said fulcrum and the said plane in directions normal to such plane, and means whereby relative translational adjustments of the work and tool supports effected by the control means are accompanied by corresponding relative adjustments between the fulcrum and the point of contact between the tracer and master profile, so that the adjustments effected by the control means tend to restore the beam to the zero position parallel to the primary plane.

3. A copying machine comprising a supporting base or pedestal, a main carriage mounted on said base, means whereby the carriage is adjusted in two directions respectively parallel and normal to a primary plane, a rotary work support on said carriage, a rotary copy or pattern support on said carriage, a support for a tool mounted on the base, a support for a tracer or pick-up on the base, for following the outline of a sample, pattern or master profile on the copy support, interconnecting means between the work and copy supports whereby said supports rotate in synchronism on the carriage, relative translational and rotational movements between the tool and work supports being a reproduction of the relative translational and rotational movements between the tracer and copy supports, a tracer or pick-up carried by the tracer support and comprising a pivoted straight edge or beam which bears tangentially against the master profile, and control means whereby the carriage is adjusted in the said two directions in accordance with angular deflection of the beam about its fulcrum from a position parallel to the primary plane and relative translational movement between said fulcrum and the primary plane in directions normal to such plane, the relative translational adjustments of the carriage and tool support being thus accompanied by corresponding relative adjustments between the fulcrum and the point of contact between the beam and the master profile, so that the adjustments of the carriage effected by the control means tend to restore the said point of contact to a position of coincidence with the fulcrum whereby the beam is also restored to the position parallel to the primary plane.

4. A copying machine comprising a rotary work support, a rotary copy or pattern support, a support for a tool which is to operate on the work carried by the work support, a support for a tracer or pick-up for following the outline of a sample, pattern or master profile carried by the copy support, means interconnecting the supports whereby relative movement between the tool and work supports is a reproduction of the relative movement between the tracer and copy supports, a carrier member mounted on the tracer support, said carrier member being movable on the tracer support in directions normal to a primary plane, a straight edge or beam pivoted on the carrier member, resilient means biassing the carrier member in a direction to urge the beam into contact with the master profile, resilient means tending to maintain the beam parallel to the said primary plane, and control means whereby relative translational adjustments between the tool and work supports are controlled in accordance with angular deflection of the beam about its fulcrum from a position parallel to the primary plane and relative translational movement between the fulcrum and the primary plane in directions normal to said plane.

5. A copying machine comprising a supporting base or pedestal, a main carriage mounted on said base, means whereby the carriage is adjusted in two directions respectively parallel and normal to a primary plane, a rotary work support on said carriage, a rotary copy or pattern support on said carriage, a support for a tool mounted on said base, a support for a tracer or pick-up on the base for following the outline of a sample, pattern or master profile on the copy support, interconnecting means between the work and copy supports whereby said supports rotate in synchronism on the carriage, relative translational and rotational movements between the tool and work supports being a reproduction of the relative translational and rotational movements between the tracer and copy supports, a carrier member mounted on said tracer support and movable thereon in directions normal to the primary plane, a straight edge or beam piovted on said carrier member, a spring urging the carrier member in a direction normal to the primary plane and thus biassing the beam into contact with the master profile, a spring tending to maintain the beam parallel to the primary plane, and control means whereby the carriage is adjusted in the said two directions in accordance with angular deflection of the beam from a position parallel to the primary plane and relative translational movement between the fulcrum and the primary plane in directions normal to such plane, the translational adjustments of the carriage relative to the tool support being thus accompanied by corresponding relative adjustments between the fulcrum and the point of contact between the beam and the master profile, so that the adjustments of the carriage effected by the control means tend to restore the said point of contact to a position of coincidence with the fulcrum whereby the beam is restored to the zero position parallel to the primary plane.

6. A copying machine comprising a rotary work support, a rotary copy or pattern support, a support for a tool which is to operate on the work carried by the work support, a support for a tracer or pick-up for following the outline of a sample, pattern or master profile carried by the copy support, means interconnecting the supports whereby relative movement between the tool and the work supports is a reproduction of the relative movement between the tracer and copy supports, a tracer or pick-up carried by the tracer support and comprising a pivoted straight edge or beam which bears tangentially against the master profile, and photoelectric control means whereby relative translational adjustments between the tool and work supports are controlled in accordance with angular deflection of the beam about its fulcrum from a position parallel to a primary plane and relative translational movement between said fulcrum and the primary plane in directions normal to said plane.

7. A copying machine comprising a supporting base or pedestal, a main carriage mounted on said base, means whereby the carriage is adjusted in two directions respectively parallel and normal to a primary plane, a rotary work support on said carriage, a rotary copy or pattern support on the carriage, a support for a tool mounted on said base, a support for a tracer or pick-up on the base for following the outline of a sample, pattern or master profile on the copy support, interconnecting means between the work and copy supports whereby said supports rotate in synchronism on the carriage, relative translational and rotational movements between the tool and work supports being a reproduction of the relative translational and rotational movements between the tracer and copy supports, a carrier member mounted on said tracer support and movable thereon in directions normal to the primary plane, a straight edge or beam pivoted on the carrier member, a spring urging the carrier member in a direction normal to the primary plane and thus biassing the beam into tangential contact with the master profile, a spring tending to maintain the beam parallel to the primary plane, photoelectric control means whereby the carriage is adjusted in a direction parallel to the primary plane in accordance with deflection of the beam from a zero position parallel to the primary plane, and photoelectric control means whereby the carriage is adjusted in a direction normal to the primary plane in accordance with the translational movement of the carrier member, and therefore the fulcrum of the beam, normal to the said plane, the translational adjustments of the carriage being thus accompanied by relative adjustments of the fulcrum and the point of contact between the beam and the master profile, so that the adjustments of the carriage effected by the control means tends to restore the said point of contact to a position of coincidence with said fulcrum whereby the carrier member and beam are restored to the zero position with the beam parallel to the primary plane.

8. A copying machine comprising a rotary work support, a rotary copy or pattern support, a support for a tool which is to operate on the work carried by the work support, a support for a tracer or pick-up for following the outline of a sample, pattern or master profile carried by the copy support, means interconnecting the supports whereby relative movement between the tool and the work supports is a reproduction of the relative movement between the tracer and copy supports, a tracer or pick-up carried by the tracer support and comprising a pivoted straight edge or beam which bears tangentially against the master profile, and electromagnetic control means whereby relative translational adjustments between the tool and work supports are controlled in accordance with angular deflection of the beam about its fulcrum from a position parallel to a primary plane and relative translational movement between said fulcrum and the primary plane in directions normal to said plane.

9. A copying machine comprising a supporting base or pedestal, a main carriage mounted on said base, means whereby the carriage is adjusted in two directions respectively parallel and normal to a primary plane, a rotary work support on said carriage, a rotary copy or pattern support on the carriage, a support for a tool mounted on said base, a support for a tracer or pick-up on the base for following the outline of a sample, pattern or master profile on the copy support, interconnecting means between the work and copy supports whereby said supports rotate in synchronism on the carriage, relative translational and rotational movements between the tool and work supports being a reproduction of the relative translational and rotational movements between the tracer and copy supports, a carrier member mounted on said tracer support and movable thereon in directions normal to the primary plane, a straight edge or beam pivoted on the carrier member, a spring urging the carrier member in a direction normal to the primary plane and thus biassing the beam into tangential contact with the master profile, a spring tending to maintain the beam parallel to the primary plane, electromagnetic control means whereby the carriage is adjusted in a direction parallel to the primary plane in accordance with deflection of the beam from a zero position parallel to the primary plane, and electromagnetic control means whereby the carriage is adjusted in a direction normal to the primary plane in accordance with the translational movement of the carrier member, and therefore the fulcrum of the beam, normal to the said plane, the translational adjustments of the carriage being thus accompanied by relative adjustments of the fulcrum and the point of contact between the beam and the master profile, so that the adjustments of the carriage effected by the control means tends to restore the said point of contact to a position of coincidence with said fulcrum whereby the carrier member and beam are restored to the zero position with the beam parallel to the primary plane.

10. A copying machine as claimed in claim 8, in which the electromagnetic control means comprises two armatures cooperating respectively with two pairs of balanced coils, and relative movement between one armature and its associated coils, is effected by the angular movement of the beam about its fulcrum whilst relative movement between the other armature and its associated coils is effected by the translational movement of the fulcrum, the two pairs of balanced coils respectively controlling electrical outputs employed for effecting relative movement between the tool and work supports parallel and normal to the primary plane.

11. A copying machine as claimed in claim 9, in which the electromagnetic control means comprises two armatures cooperating respectively with two pairs of balanced coils, and relative movement between one armature and its associated coils is effected by the angular movement of the beam on the carrier member whilst relative movement between the other armature and its associated coils is effected by the translational movement of the carrier member, the two pairs of balanced coils respectively controlling electrical outputs employed for effecting translational movement of the carriage at right angles to and parallel to the primary plane.

12. A copying machine as claimed in claim 7, in which the photoelectric control means comprises two light sources, two light-deflecting devices associated therewith, two photo-electric cells associated with each deflecting device, and means whereby the one light-deflecting device is actuated in accordance with deflection of the beam about its fulcrum thereby energising one or other of the associated cells in accordance with the direction and magnitude of the deflection of the beam, whilst the other light deflecting device is actuated in accordance with the translational movement of the carrier member thereby energising one or other of the associated cells in accordance with the magnitude and direction of translational movement of the carrier member, the two pairs of cells respectively controlling electrical outputs employed for effecting translational adjustments of the main carriage in directions parallel and normal to the primary plane.

13. A copying machine as claimed in claim 9, in which the carriage is adjusted translationally parallel and normal to the primary plane by electric motors, and the electromagnetic control means comprises two armatures cooperating respectively with two pairs of balanced coils, and means whereby relative movement between the one armature and its associated coils is effected by the angular movement of the beam on the carrier member whilst relative movement between the other armature and its associated coils is effected by the translational movement of the carrier member, the two pairs of balanced coils respectively controlling electrical outputs applied to the electric motors.

14. A copying machine as claimed in claim 7, in which the carriage is adjusted translationally parallel and normal to the primary plane by electric motors, and the photoelectic control means comprises two light sources, two light-deflecting devices associated therewith respectively, two photoelectric cells associated with each light-deflecting device, and means whereby the one light-deflecting device is actuated in accordance with deflection of the beam about its fulcrum thereby energising one or other of the associated cells in accordance with the direction and magnitude of the deflection of the beam, whilst the other light-deflecting device is actuated in accordance with the translational movement of the carrier member thereby energising one or other of the associated cells in accordance with the magnitude and direction of translational movement of the carrier member, the two pairs of cells respectively controlling electrical outputs applied to the electric motors for operating the main carriage.

15. A copying machine as claimed in claim 3, in which the main carriage is supported on the base or pedestal by means of bearing devices each comprising a sole plate through which fluid under pressure is supplied to the cooperating surfaces of the carriage and sole plate, whereby the carriage is adjustable in all directions over the sole plates with a film of fluid between the sole plates and the carriage.

16. A copying machine as claimed in claim 3, in which an intermediate floating slide is disposed between the main carriage and the supporting base or pedestal with the weight of the carriage supported directly by the base, the floating slide cooperating respectively with guides on the base and carriage, which guides are at right angles to each other.

17. A copying machine as claimed in claim 1, in which the tracer or pick-up is formed as a single detachable unit which can be mounted on the tracer support in either of two alternative positions for tracing convex and concave master profiles respectively.

18. A copying machine as claimed in claim 9, in which the tracer or pick-up is formed as a single detachable unit which can be mounted on the tracer support in either of two alternative positions for tracing convex and concave master profiles respectively.

19. A copying machine comprising a supporting base or pedestal, a basic slide adjustable along horizontal guides on the base at right angles to a vertical primary plane, a main carriage adjustable along guides on the basic slide parallel to said plane, means for manually adjusting the basic slide on the associated guides, means for manually adjusting the carriage along the associated guides on the basic slide, two electric motors for adjusting the basic slide along its guides in opposite directions respectively, two electric motors for adjusting the carriage along its guides in opposite directions respectively, a rotary work shaft carried by the main carriage, a work table carried by the work shaft, a rotary pattern or copy shaft carried by the main carriage, a pattern table carried by the copy shaft, interconnecting mechanism between said shafts, means for rotating said shafts about their vertical axes, a support for a grinding wheel on the base, means for rotating said grinding wheel about a vertical axis with the operative edge of the grinding wheel lying in the primary plane, a tracer or pick-up support on the base, a pick-up unit mounted on said tracer support and comprising a carrier member movable along a guide at right angles to the primary plane, a beam pivoted on the carrier member, springs tending to maintain the beam parallel to the primary plane, a spring biassing the carrier member in a direction at right angles to the primary plane so that the beam is urged into tangential contact with a master profile carried by the pattern table, two light sources, a light-deflecting device associated with one light source and carried by the beam so as to be coincident with the fulcrum thereof, a light-deflecting device associated with the other light source, a rotary member carrying said second light-deflecting device, interconnecting means between the carrier member and said rotary member whereby the light-deflecting device carried thereby is angularly adjusted in accordance with the translational movement of the carrier member, two pairs of photoelectric cells each pair associated with one of the light-deflecting devices whereby one or other of the two cells of each pair is energised in accordance with the direction and magnitude of the deflection of the associated light-deflecting device, electric amplifiers associated with the cells and means whereby the outputs of the amplifiers are applied to the electric motors, for translationally adjusting the basic slide and main carriage.

20. A copying machine comprising a supporting base or pedestal, a basic slide adjustable along guides on the base in a direction parallel to a primary plane, a main carriage adjustable along guides on the basic slide at right angles to said plane, manually operable means for adjusting the basic slide along its guides, manually operable means for adjusting the carriage along its guides, two reversible electric motors respectively for adjusting the basic slide and carriage along their guides, a rotary work shaft carried by the main carriage, a rotary copy or pattern shaft carried by the main carriage, a rotary checking shaft carried by the main carriage, a work table carried by the work shaft, a pattern table carried by the copy shaft, interconnecting mechanism between the work, copy and checking shafts, means for rotating the shafts in synchronism, about their vertical axes, a support for a grinding wheel carried by the base, means for rotating said grinding wheel about a horizontal axis with the operative edge of the wheel in the primary plane, a tracer or pick-up support carried by the base adjacent to the pattern table, a pick-up unit carried by said tracer support and comprising a carrier member, spring ligaments connecting said carrier member to the tracer support, a beam-supporting arm connected to the carrier by spring ligaments which permit angular movement of the arm about its longitudinal axis which is inclined to the primary plane, a beam carried by said arm whose spring ligament support tends to maintain the arm parallel to the primary plane, an armature carried by the beam-supporting arm, two balanced coils carried by the carrier member, the said armature being moved relatively to the two associated coils in accordance with the angular movement of the beam about the longitudinal axis of the arm, a second pair of balanced coils, a second armature cooperating therewith, means whereby said second armature is moved relatively to its associated coils in accordance with translational movement of the carrier member at right angles to the length of the beam, two electric bridge circuits, each pair of the said coils constituting two of the arms of one of the bridges, means connecting said bridges to two electronic amplifiers, and means connecting said amplifiers to the field circuits of the two reversible motors respectively, the one motor being thus controlled to adjust the main carriage in accordance with the direction and magnitude of the angular deflection of the beam from a position parallel to the primary plane whilst the other motor is controlled to adjust the main carriage in accordance with the direction and magnitude of the translational movement of the said beam at right angles to said plane.

ERNEST ALBERT COOKE.

REFERENCES CITED

The following references are of record in the file of this patent:

UNITED STATES PATENTS

| Number | Name | Date |
| --- | --- | --- |
| 2,125,584 | Rotzoll | Aug. 2, 1938 |
| 2,259,472 | Johnson | Oct. 21, 1941 |
| 2,388,555 | Kuehni et al | Nov. 6, 1945 |